(12) United States Patent
Schnitman

(10) Patent No.: US 9,325,857 B2
(45) Date of Patent: Apr. 26, 2016

(54) EXCHANGING ROAMING AND LOCAL MESSAGES BETWEEN MOBILE DEVICES

(71) Applicant: Myles J. Schnitman, Solana Beach, CA (US)

(72) Inventor: Myles J. Schnitman, Solana Beach, CA (US)

( * ) Notice: Subject to any disclaimer, the term of this patent is extended or adjusted under 35 U.S.C. 154(b) by 0 days.

(21) Appl. No.: 14/156,290

(22) Filed: Jan. 15, 2014

(65) Prior Publication Data

US 2015/0201321 A1    Jul. 16, 2015

(51) Int. Cl.
| | |
|---|---|
| *H04M 11/04* | (2006.01) |
| *H04M 11/00* | (2006.01) |
| *H04W 4/00* | (2009.01) |
| *H04M 15/00* | (2006.01) |
| *H04M 15/08* | (2006.01) |
| *H04M 15/10* | (2006.01) |
| *H04W 4/24* | (2009.01) |

(52) U.S. Cl.
CPC .......... *H04M 15/8351* (2013.01); *H04M 15/08* (2013.01); *H04M 15/10* (2013.01); *H04M 15/8038* (2013.01); *H04M 15/851* (2013.01); *H04M 15/858* (2013.01); *H04W 4/00* (2013.01); *H04W 4/24* (2013.01)

(58) Field of Classification Search
CPC .................................................. H04M 15/8038
USPC .................................. 455/404.2, 406, 432.1
See application file for complete search history.

(56) References Cited

U.S. PATENT DOCUMENTS

| | | | |
|---|---|---|---|
| 2004/0249649 A1 | 12/2004 | Stratton et al. | |
| 2008/0139202 A1* | 6/2008 | Wang et al. | 455/432.1 |
| 2008/0274715 A1* | 11/2008 | Heit et al. | 455/406 |
| 2010/0017470 A1* | 1/2010 | Hyoung et al. | 709/204 |
| 2010/0120405 A1 | 5/2010 | Sapir et al. | |
| 2011/0081920 A1* | 4/2011 | Hung et al. | 455/456.3 |
| 2013/0022030 A1* | 1/2013 | Hillier | 370/338 |

FOREIGN PATENT DOCUMENTS

WO    WO-2012/177843 A2    12/2012

* cited by examiner

*Primary Examiner* — Thomas Lett
(74) *Attorney, Agent, or Firm* — Mintz Levin Cohn Ferris Glovsky and Popeo, P.C.

(57) ABSTRACT

The subject matter disclosed herein provides methods for exchanging local and roaming messages between mobile devices using a mobile application. The method can receive a request from a first mobile device to initiate a communication session with a second mobile device. The method can further determine whether the second mobile device is out of zone. The method can further cause the first mobile device to display a first user interface based on the determining. The first user interface can provide one or more options to initiate an outgoing roaming communication session or an outgoing local communication session with the second mobile device. Related apparatus, systems, techniques, and articles are also described.

20 Claims, 12 Drawing Sheets

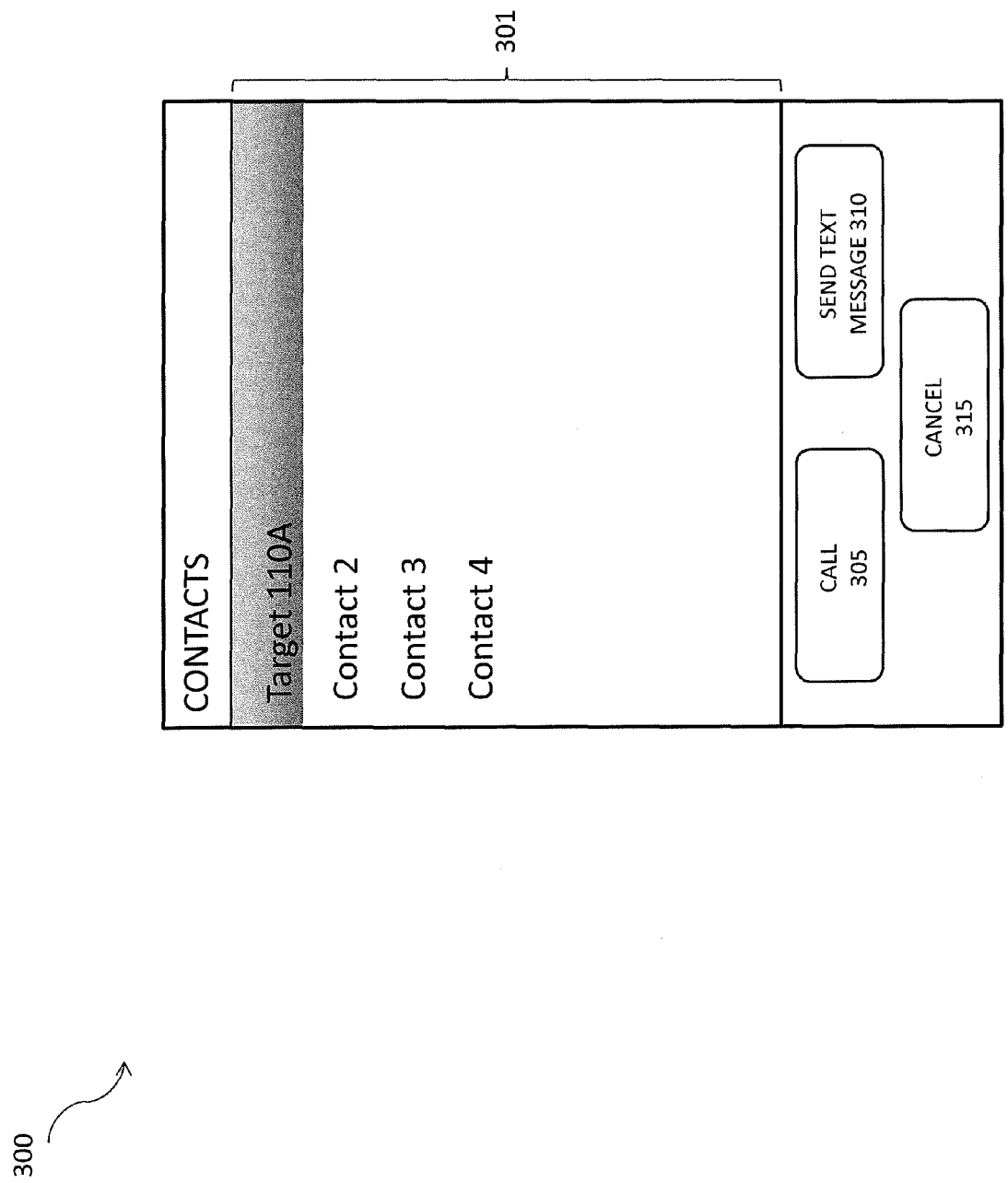

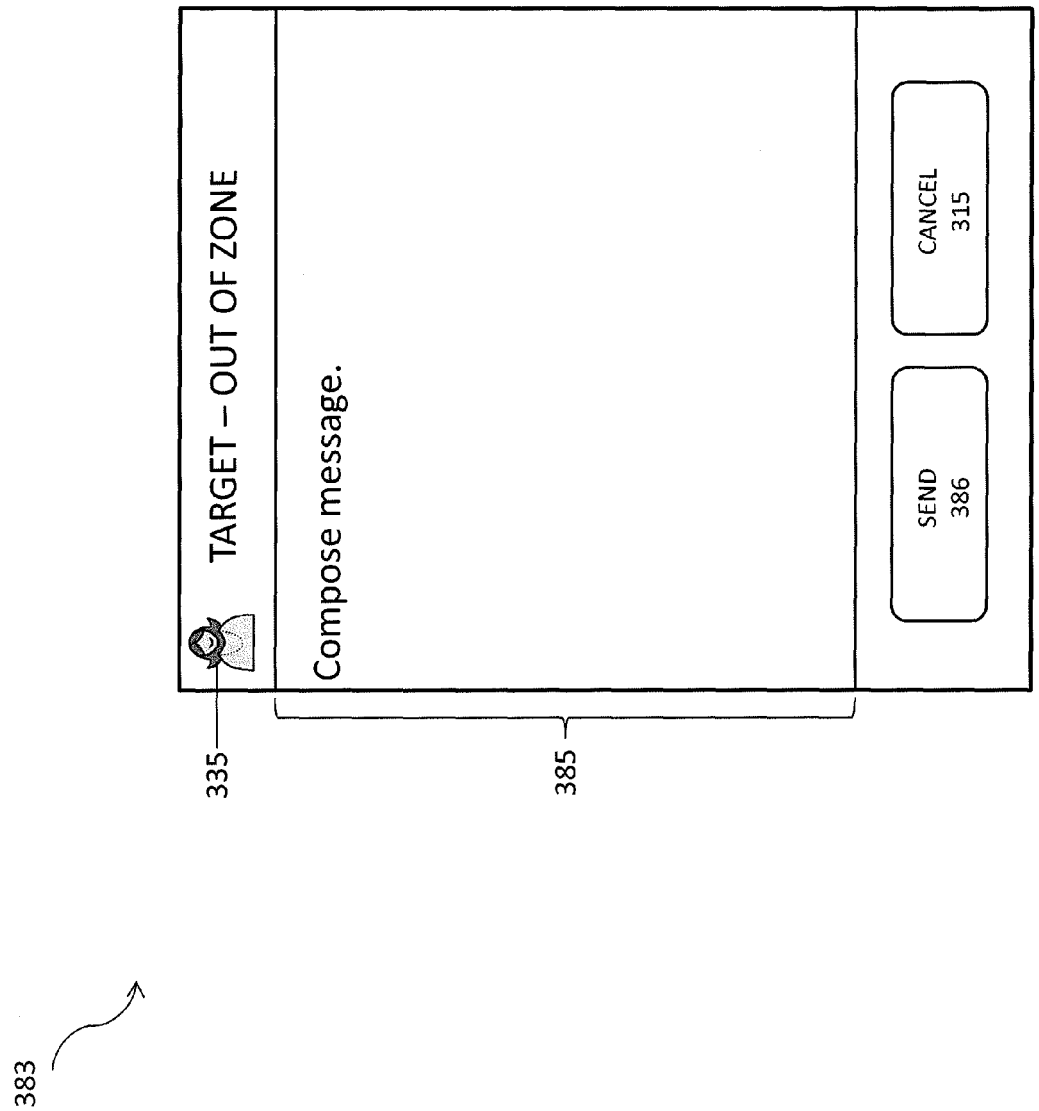

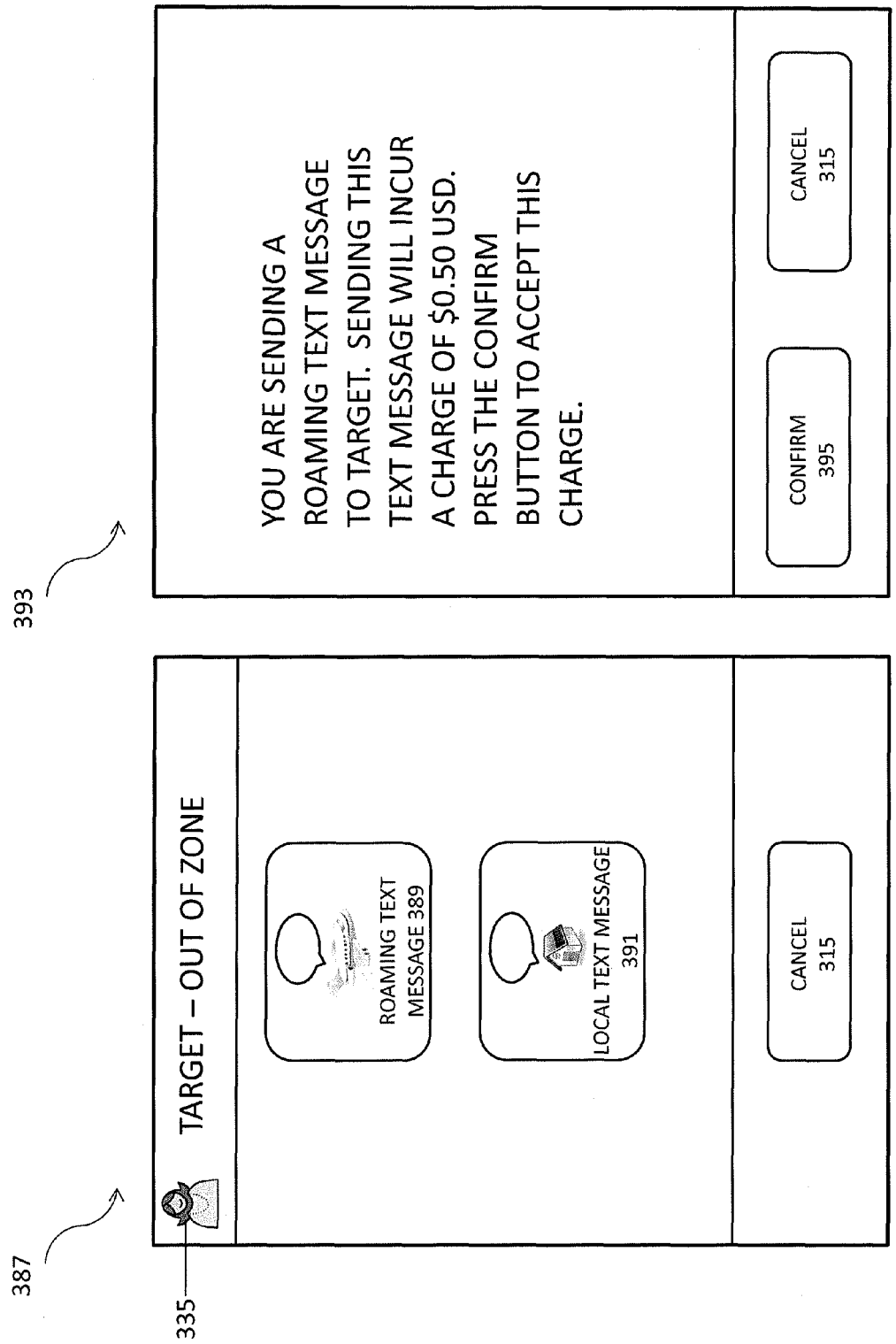

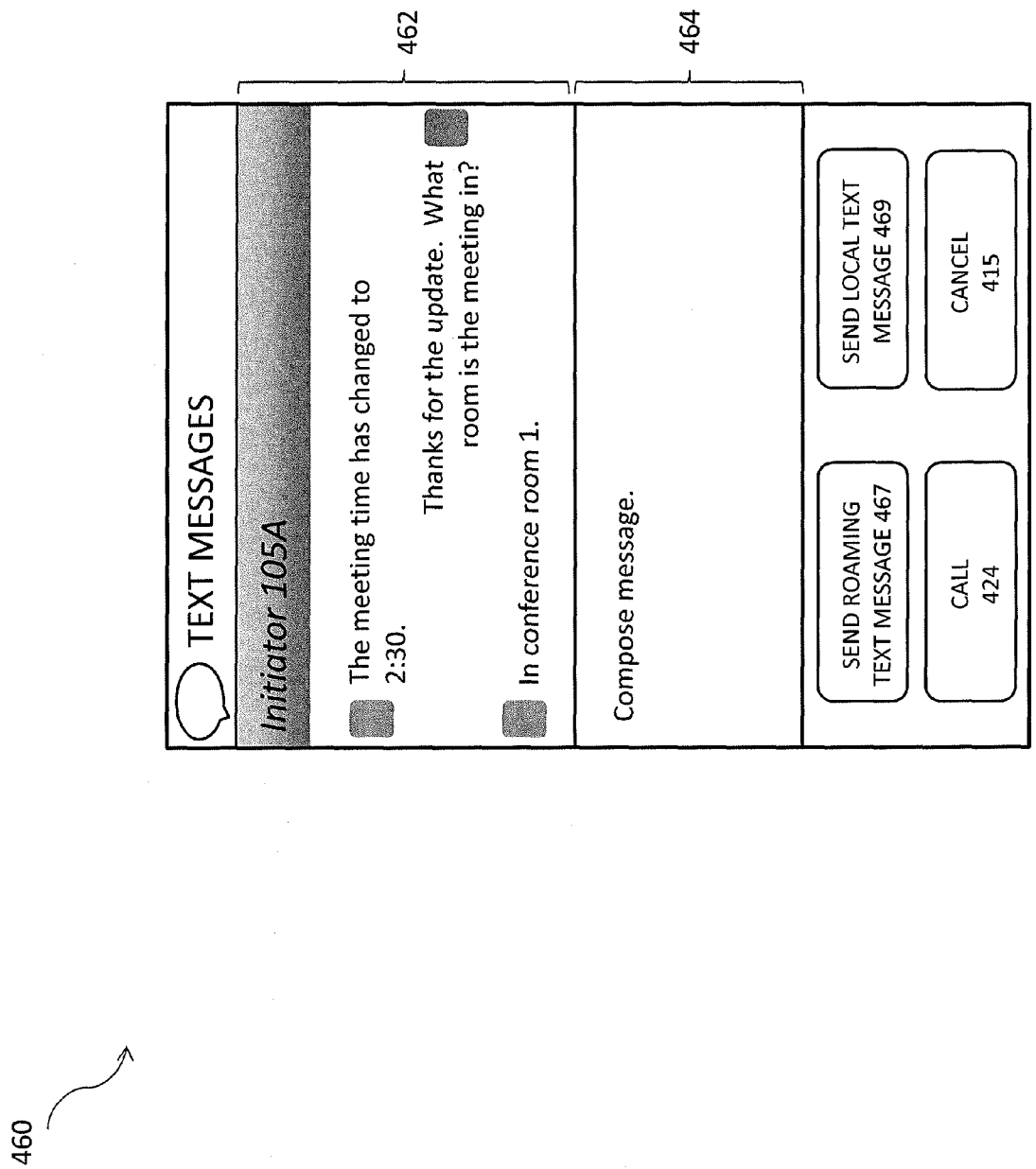

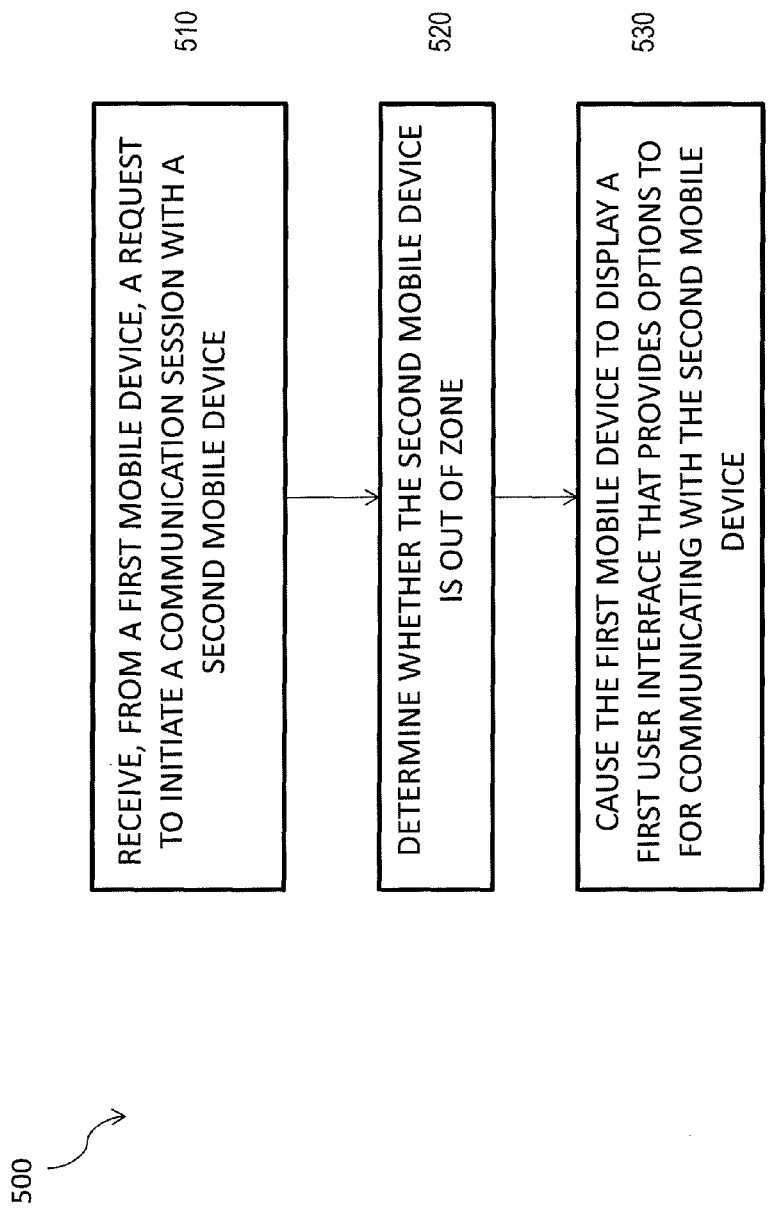

EXCHANGING ROAMING AND LOCAL MESSAGES BETWEEN MOBILE DEVICES

TECHNICAL FIELD

This disclosure relates to communication between mobile devices and, more particularly, to the exchange of roaming and local voice, text, or video messages between mobile devices when one or both mobile devices is out of zone.

BACKGROUND

Mobile technology allows people on the go to stay connected. As cellular phones, tablet computers, and laptop computers become ubiquitous, people are more accessible today than in previous decades. The convenience associated with calling someone no matter their location, however, can create disturbances for the party being called. These disturbances can arise, for example, if the called party is in a different time zone or in a different country. While many mobile devices support operational modes that allow a user to reject incoming calls (such as a do not disturb mode or a meeting mode), these modes generally function in an all or nothing fashion—either all calls are rejected or all calls are allowed. When these modes are enabled, callers can leave voicemail messages. However, these modes provide little flexibility in how these messages are delivered.

SUMMARY

In some implementations, methods and apparatus, including computer program products, are provided for exchanging local and roaming messages between mobile devices using a mobile application.

In one aspect, a request from a first mobile device to initiate a communication session with a second mobile device is received. It is determined whether the second mobile device is out of zone. The first mobile device is caused to display a first user interface based on the determining. The first user interface provides one or more options to initiate an outgoing roaming communication session or an outgoing local communication session with the second mobile device.

The above methods, apparatus, and computer program products may, in some implementations, further include one or more of the following features.

The second mobile device can be out of zone when at least one of the following conditions is satisfied: the first mobile device and the second mobile device are in different time zones; the first mobile device and the second mobile device are in different countries; the first mobile device is a predetermined distance away from the second mobile device; the second mobile device is roaming outside of a predetermined zone; and a charge is incurred for initiating communication by the first mobile device or for accessing the communication by the second mobile device.

The communication session, the outgoing roaming communication session, and the outgoing local communication session can include one or more of a phone call, a video call, a voicemail message, and a text message.

The first user interface can display a message indicating that the second mobile device is out of zone.

A charge can be levied on the first mobile device for initiating an outgoing roaming communication session. An amount to be charged can be sent to the first mobile device. Confirmation of consent to the amount to be charged can be received from the first mobile device. The sending and the receiving can be performed before the levying.

The first mobile device can be allowed to initiate an outgoing local communication session free of charge.

The outgoing roaming communication session can be received from the first mobile device. The outgoing roaming communication session can be sent to the second mobile device as an incoming local communication session.

The second mobile device can be allowed to access the incoming local communication session free of charge.

The outgoing local communication session can be received from the first mobile device. The outgoing local communication session can be sent to the second mobile device as an incoming roaming communication session.

A charge can be levied on the second mobile device for accessing the incoming roaming communication session. An amount to be charged can be sent to the second mobile device. Confirmation of consent to the amount to be charged can be received from the second mobile device. The sending and the receiving can be performed before the levying.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIGS. 3A-3H illustrate graphical user interfaces that can be displayed on a first mobile device, in accordance with some example implementations;

FIGS. 4A-4F illustrate graphical user interfaces that can be displayed on a second mobile device, in accordance with some example implementations; and FIG. 5 illustrates a flowchart for initiating a communication session by a first mobile device with a second mobile device, in accordance with some example implementations.

Like reference symbols in the various drawings indicate like elements.

DETAILED DESCRIPTION

This application discloses techniques for exchanging local and roaming messages between mobile devices using a mobile application. This mobile application can be installed on the mobile device of a calling party ("initiator") and on the mobile device of a party being called ("target"). In some implementations, the mobile application can be managed and/or provided by one or more service providers. If the target is out of zone, the initiator can use the mobile application to leave a roaming message or a local message for the target.

Figure 1:
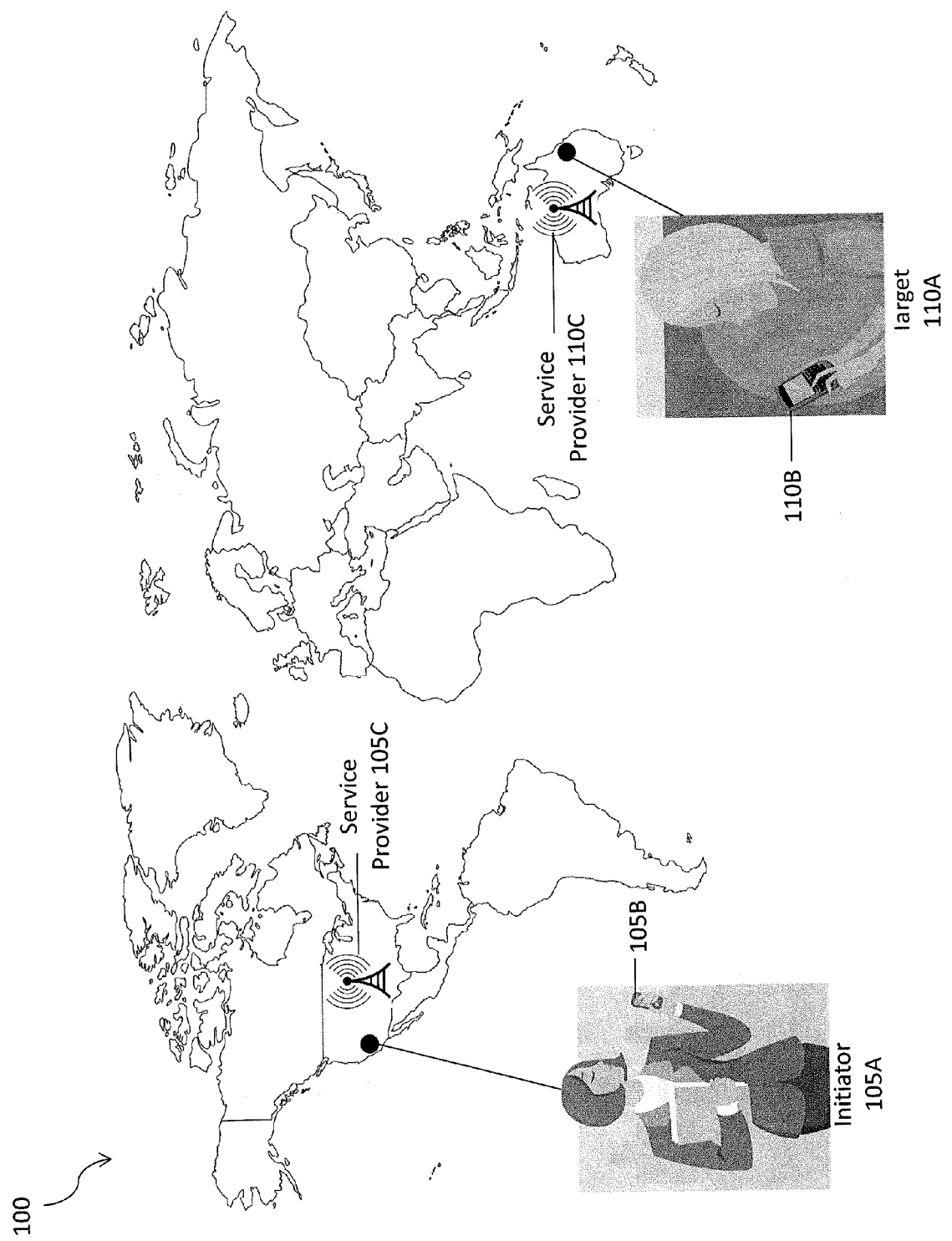
FIG. 1 illustrates a communication session between a first mobile device and a second mobile device, in accordance with some example implementations.

FIG. 1 illustrates an example 100 that showcases the benefits of the systems, methods, and computer program products disclosed herein. In example 100, initiator 105A can use mobile device 105B to initiate a communication session with target 110A by placing a phone call, placing a video call, leaving a voicemail message, or sending a text message via one or more of service providers 105C and 110C. Target 110A can use mobile device 110B to retrieve, receive, or respond to the communication session via one or more of service provider 105C and 110C. Although mobile devices 105B and 110B are illustrated as cellular phones, other types of mobile devices can be used including, for example, tablet computers, laptop computers, and the like.

In example 100, initiator 105A can be located on the west coast of the United States, and target 110A can be located on the east coast of Australia. Initiator 105A can initiate a communication session with target 110A by placing a call through service provider 105C which, in turn, can transfer the call to service provider 110C. In some situations, the phone call may be made in vain if initiator 105A is unaware of the target's 110A current location. This may happen, for example, if initiator 105A is calling target 110A to schedule an in-person meeting at a location near the initiator later that day. If initiator 105A knows that target 110A is currently traveling abroad, she can recognize that such a meeting may be difficult or impossible to schedule and may not place the call. Because initiator 105A and target 110A can be in different time zones, having this information can also deter the initiator from calling the target at an inconvenient or an inappropriate hour.

In order to prevent the above-identified situations from occurring, the instant application discloses techniques for informing initiator 105A when target 110A is out of zone and allowing the initiator to leave a message for the out of zone target. While this application refers to the locations of initiator 105A and target 110A, it can be assumed that these locations correspond to the locations of mobile devices 105B and 110B, respectively. Target 110A can be out of zone if, for example, she is a predetermined distance away from the initiator (i.e., mobile device 110B is a predetermined distance away from mobile device 105B). Other criteria can be used to define when target 110A is out of zone. For example, this determination can be based on time zones (e.g., if initiator 105A and target 110A are in different time zones), geographical designations (e.g., if the initiator and the target are in different cities, states, or countries), technical considerations (e.g., if mobile devices 105B and 110B are being serviced by multiple communication networks or service providers), a particular service provider's roaming area (e.g., if target 110A is roaming outside of its home area), whether a charge will be incurred either for initiating communication by initiator 105A or for accessing or responding to the communication by target 110A, and the like. In some implementations, these criteria can be used in various combinations to determine whether target 110A is out of zone.

With regard to these criteria, service providers 105C and 110C can obtain the information needed to determine whether mobile device 110B is out of zone from mobile devices 105B and 110B and share this information with each other using known methods. For example, a base station operated by service provider 110C in Australia can detect the presence of mobile device 110B and can register its presence with the service provider. Upon receiving this registration information, service provider 110C can consult an internal list of user profiles to determine whether mobile device 110B is an existing customer or a visiting device. If, for example, mobile device 110B is visiting, service provider 110C can determine the device's home service provider (e.g., service provider 105C) and transfer information regarding the device's location to the home service provider 105C. Upon receiving this information, home service provider 105C can consult the one or more out of zone criteria described above to determine the accessibility of mobile device 110B. For example, when initiator 105A initiates a communication session with target 110A (e.g., by placing a call) via service provider 105C, the service provider can compare the locations of mobile device 105B and 110B to determine whether the target is out of zone. If so, service provider 105C can cause mobile device 105B to display one or more of the graphical user interfaces illustrated in the figures described herein.

Figure 2:
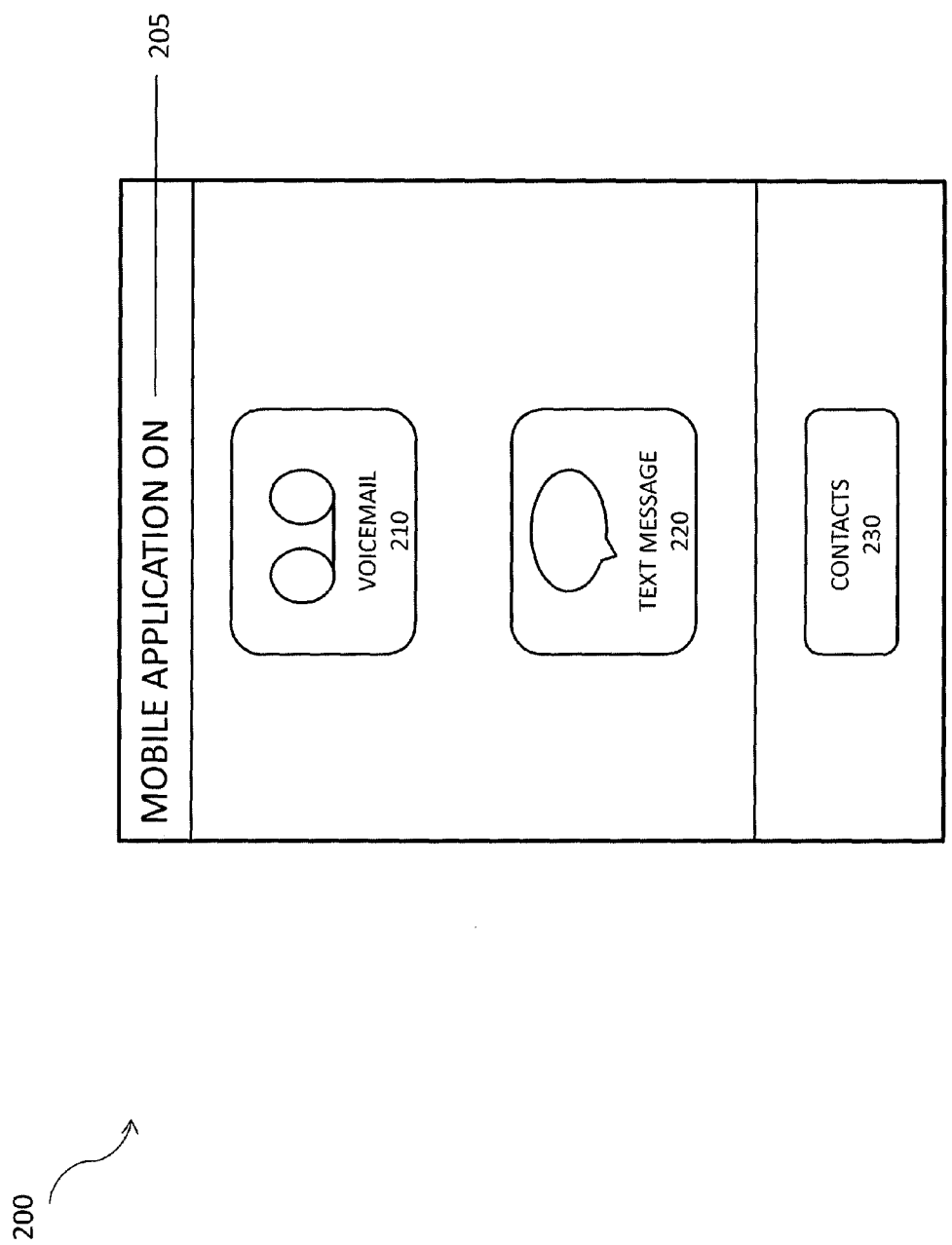
FIG. 2 illustrates a home screen that can be displayed on a first mobile device and a second mobile device, in accordance with some example implementations.
Figures 3B, 3C:
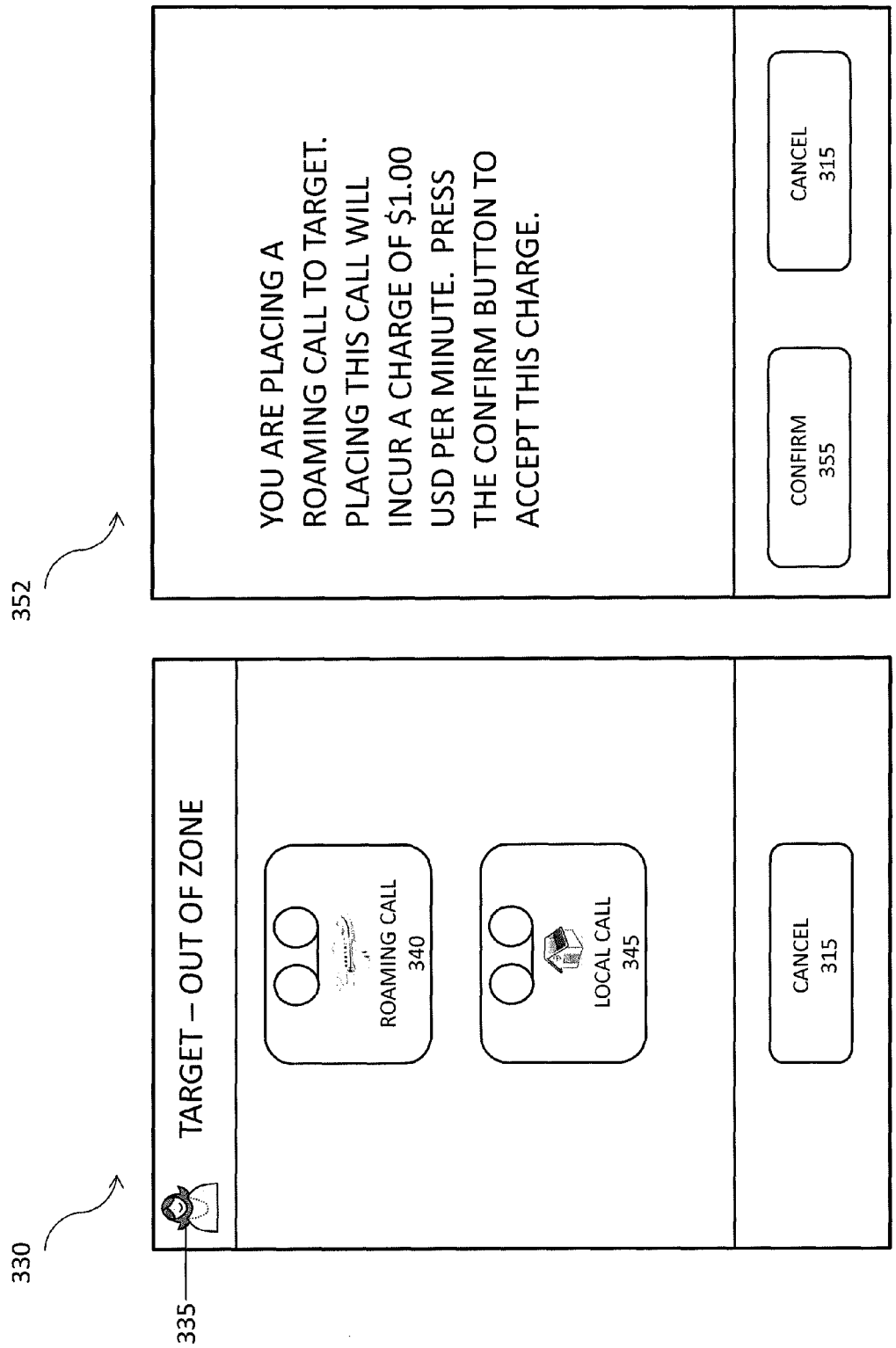
Figure 3E:
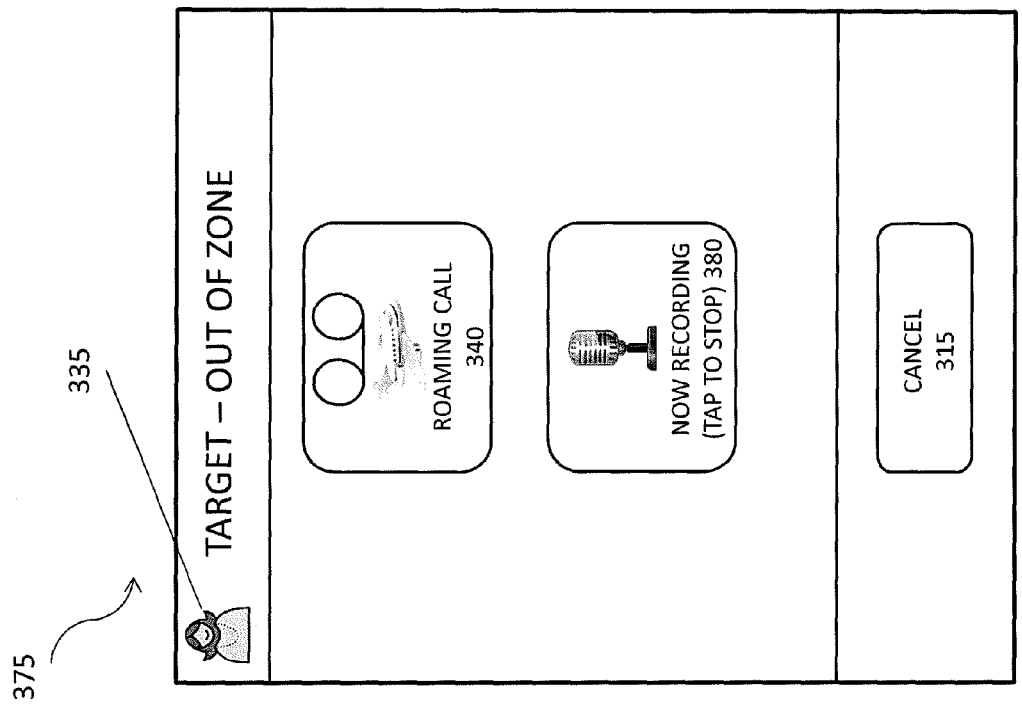
Figure 3D:
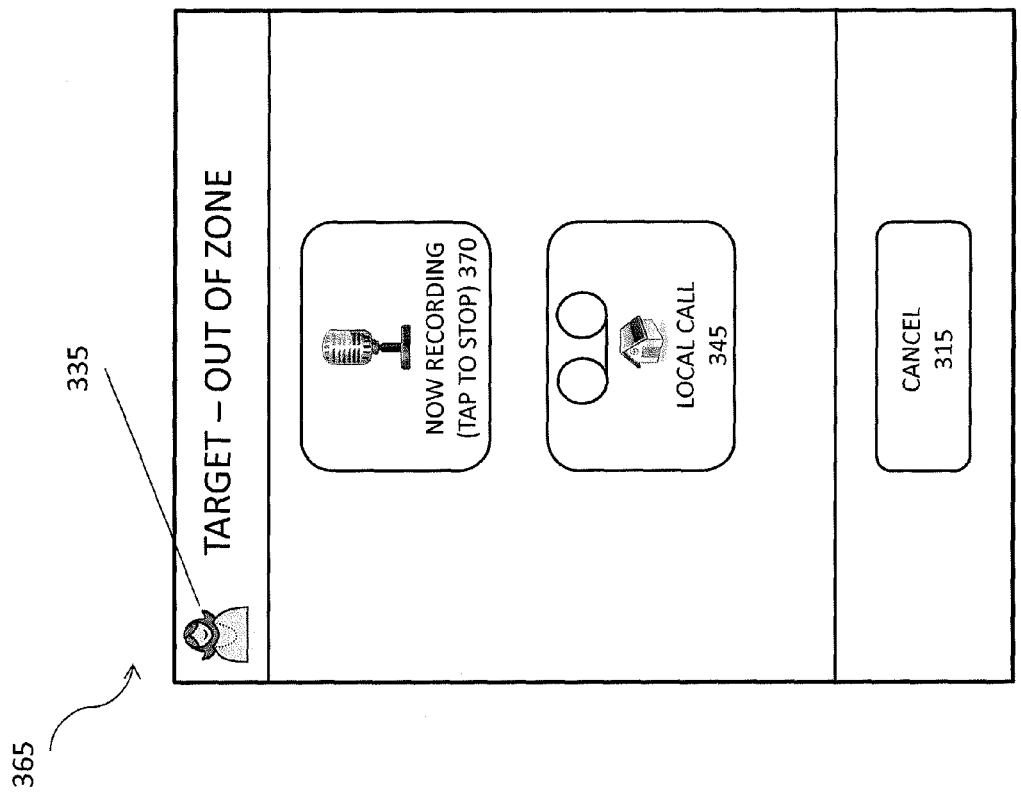

FIG. 2 illustrates a home screen 200 of a mobile application running on mobile devices 105B and 110B. Area 205 can indicate whether this mobile application is turned on (i.e., activated) or off. Initiator 105A and target 110A can toggle the mobile application on their respective mobile devices between on and off states by selecting or tapping area 205. Initiator 105A and target 110A can use home screen 200 to check their voicemail messages or text messages by selecting buttons 210 and 220, respectively. These buttons can appear as graphical objects or icons when displayed on mobile devices 105B and 110B. Initiator 105A and target 110A can select contacts button 230 to contact or communicate with another party. Various types of communication sessions can be initiated including, for example, a phone call, a video call, a voicemail message, a text message, and the like. The following paragraphs describe the interaction of initiator 105A and target 110A with the mobile application running on mobile devices 105B and 110B, respectively. Starting from home screen 200, initiator 105A can use the graphical user interfaces illustrated in FIGS. 3A-3H to initiate a communication session with target 110A. Mobile device 105B can display the graphical user interfaces illustrated in FIGS. 3A-3H. Target 110A can use the graphical user interfaces illustrated in FIGS. 4A-4F and displayed on mobile device 110B to respond to communication session initiated by initiator 105A. Mobile device 110B can display the graphical user interfaces illustrated in FIGS. 4A-4F.

FIG. 3A illustrates a graphical user interface 300 that can be displayed on mobile device 105B when initiator 105A selects contacts button 230. Initiator 105A can use graphical user interface 300 to initiate a communication session with a desired contact. Initiator 105A can place a phone call or video call or send a text message to any of the contacts identified in area 301. Initiator 105A can return to home screen 200 by selecting cancel button 315.

For example, initiator 105A can call target 110A by selecting the target's name from area 301 and subsequently selecting call button 305. Upon receiving and processing these button selections, the mobile application can determine whether target 110A is out of zone based on information received from one or more of service providers 105C and 110C as described above. In some implementations, one or more of service providers 105C and 110C can determine whether target 110A is out of zone and send the results of this determination to the mobile application. Whether target 110A is out of zone relative to initiator 105A can affect the manner in which the call is placed. The call can be placed using known methods if target 110A is not of zone or if the mobile application is not activated (i.e., not turned on) on mobile device 110B. However, if target 110A is out of zone, then initiator 105A can call the target either by placing a roaming call or by placing a local call using graphical user interface 330 illustrated in FIG. 3B.

Initiator 105A can use graphical user interface 330 to place a roaming call or a local call to an out of zone target. Mobile device 105B can display graphical user interface 330 when initiator 105A selects call button 305 and when the mobile device receives an indication from one or more of service providers 105C and 110C that target 110A is out of zone. Graphical user interface 330 can include an area 335 that indicates that the person being called (i.e., target 110A) is out of zone. In some implementations, area 335 can also indicate the location of target 110A by specifying the time zone, city, state, and/or country in which the target is located. In these implementations, target 110A can adjust her privacy settings to either allow this information to be shared with all callers or a predetermined list of callers or not share this information at all. Initiator 105A can select button 340 to place a roaming call to target 110A or select button 345 to place a local call to the target. Initiator 105A can return to home screen 200 by selecting cancel button 315. In some implementations, graphical user interface 330 can be modified to allow initiator 105A to initiate a roaming video call or a local video call with target 110A.

Whether the phone call, video call, or any other communication (e.g., voicemail message or text message) is roaming or local can depend on whether there is a charge associated with the communication. This application generally refers to these various types of calls and messages collectively as a communication session. Generally, a local communication session can be free, and a roaming communication session can be associated with a service charge.

Different factors can affect the initiator's 105A decision to send an outgoing roaming communication or an outgoing local communication including, for example, the cost associated with the communication, the urgency of the communication, and the like. With regard to cost, if the charge associated with placing a roaming call or sending a roaming text message is inexpensive, for example, then initiator 105A can leave a roaming message more often than not. Message urgency can also influence whether initiator 105A initiates a roaming communication session or a local communication session. Because initiator 105A can be charged for leaving a roaming message, the initiator can reserve roaming communication sessions for urgent news (e.g., informing target 110A of a medical emergency) and reserve local communication sessions for mundane news (e.g., inviting target 110A to an upcoming dinner party). Because initiator 105A bears the service charge for a roaming communication session and not target 110A, the target is incentivized to retrieve the free communication by answering the call and/or retrieving the voicemail message or text message.

When initiator 105A initiates an outgoing roaming communication session with target 110A, one or more of service providers 105C and 110C can deliver or transfer the communication session to the target as an incoming local communication session. For example, if initiator 105A selects button 340 to place an outgoing roaming call to target 110A, service providers 105C or 110C can transfer the call to the target as an incoming local call. Because initiator 105A starts the call as a roaming call, one or more of service providers 105C and 110C can charge the initiator for placing the outgoing call. As illustrated in graphical user interface 352 of FIG. 3C, the mobile program can display the amount to be charged to initiator 105A when roaming call button 340 is selected. In some implementations, one or more of service providers 105C and 110C can transmit the charge amount to mobile device 105B which, in turn, can cause these amounts to be displayed. The mobile application and/or the one or more service providers 105C and 110C can require initiator 105A to confirm that she is willing to pay the charge before levying the charge and placing the call through the service providers. Initiator 105A can confirm the charge by selecting confirm button 335. If initiator 105A does not consent to the charge and selects cancel button 315, the mobile program can return to home screen 200. Because one or more of service providers 105C and 110C levy this charge on initiator 105A, target 110A may not incur a charge for answering the call.

When initiator 105A initiates an outgoing local communication session with target 110A, one or more of service providers 105C and 110C can transfer the communication session to the target as an incoming roaming communication session. For example, if initiator 105A selects local call button 345 to call target 110A, the initiator is not charged for placing the call. If, however, target 110A answers the call, one or more of service providers 105C and 110C can levy a charge on the target.

If target 110A does not answer the initiator's 105A call, then the initiator can leave a voicemail message for the target. This voicemail message can be left either as a roaming voicemail message or a local voicemail message depending on the type of call that was placed. If initiator 105A placed a roaming call, then mobile device 105B can display graphical user interface 365 illustrated in FIG. 3D to allow the initiator to leave a roaming voicemail message. However, if initiator 105A placed a local call, then mobile device 105B can display graphical user interface 375 illustrated in FIG. 3E to allow the initiator to leave a local voicemail message. Mobile device 105B can display graphical user interfaces 365 and 375 after a predetermined number of rings. For example, if initiator 105A has placed a roaming call to target 110A and the target does not answer the phone after five rings, the initiator can record a roaming voicemail message as indicated by button 370 of graphical user interface 365. Initiator 105A can stop the recording by selecting button 370. Similarly, initiator 105A can record a local voicemail message for target 110A using button 380. If initiator 105A does not wish to leave a voicemail message, she can select cancel button 315 to return to home screen 200.

In addition to placing a call, initiator 105A can also send text messages to target 110A from graphical user interface 300. If, for example, initiator 105A wants to send a text message to target 110A, she can select the target's name from area 301 and subsequently select send text message button 310. Upon receiving and processing these button selections, mobile device 105B can display graphical user interface 383 illustrated in FIG. 3F. Initiator 105A can compose a text message in area 385 and send the text message by selecting send button 386. If initiator 110A does not want to send the text message, she can discard the message and return to home screen 200 by selecting cancel button 315.

When send button 386 is selected, the mobile application running on mobile device 105B can determine if target 110A is out of zone. As with voicemail messages, whether target 110A is out of zone relative to initiator 105A can affect the manner in which the text message is sent. In some implementations, one or more service providers 105C and 110C can determine whether target 110A is out of zone and inform mobile device 105B of the same. If target 110A is not out of zone or if the mobile application is not activated (i.e., not turned on) on mobile device 110B, then the text message can be sent using known methods. However, if target 110A is out of zone, then initiator 105A can send the text message to target 110A either as a roaming text message or as a local text message using graphical user interface 387 illustrated in FIG. 3G.

Graphical user interface 387 can include an area 335 that indicates that target 110A is out of zone. Initiator 105A can send either a roaming text message or a local text message to target 110A by selecting buttons 389 or 391, respectively. If initiator 105A wants to discard the message, she can select cancel button 315 to return to home screen 200.

As explained above, a charge may be associated with a roaming communication session, while a local communication session can be free. For example, initiator 105A can send an outgoing roaming text message by selecting button 389. One or more of service providers 105C and 110C can deliver or transfer the outgoing roaming text message to the target as an incoming local message and charge the initiator for sending the roaming message. Target 110A can retrieve, read, or access the delivered text message for free. In some implementations, the mobile program or one or more of service providers 105C and 110C can ask initiator 105A to confirm that she is willing to pay the charge for the roaming text message before levying the charge and sending the message to target 110A. Mobile device 105B can display graphical user interface 393 illustrated in FIG. 3H to indicate the amount to be charged. One or more service of providers 105C and 110C can transmit the amount to be charged to mobile device 105B which, in turn, can cause these amounts to be displayed. Initiator 105A can accept the charge by selecting confirm button 395. If initiator 105A does not consent to the charge, she can select cancel button 315, and the mobile program can return to home screen 200.

Returning to FIG. 3G, initiator 105A can send the text message as a local text message by selecting button 391. One or more of service providers 105C and 110C can deliver or transfer the outgoing local text message to the target as an incoming roaming message free of charge to the initiator. As explained below, target 110A can incur a charge for retrieving, reading, or accessing, the incoming roaming text message.

Target 110A can use the graphical user interfaces illustrated in FIGS. 4A-4E to respond to communications from initiator 105A. These graphical user interfaces can be displayed by the mobile application running on mobile device 110B.

Figure 4A:
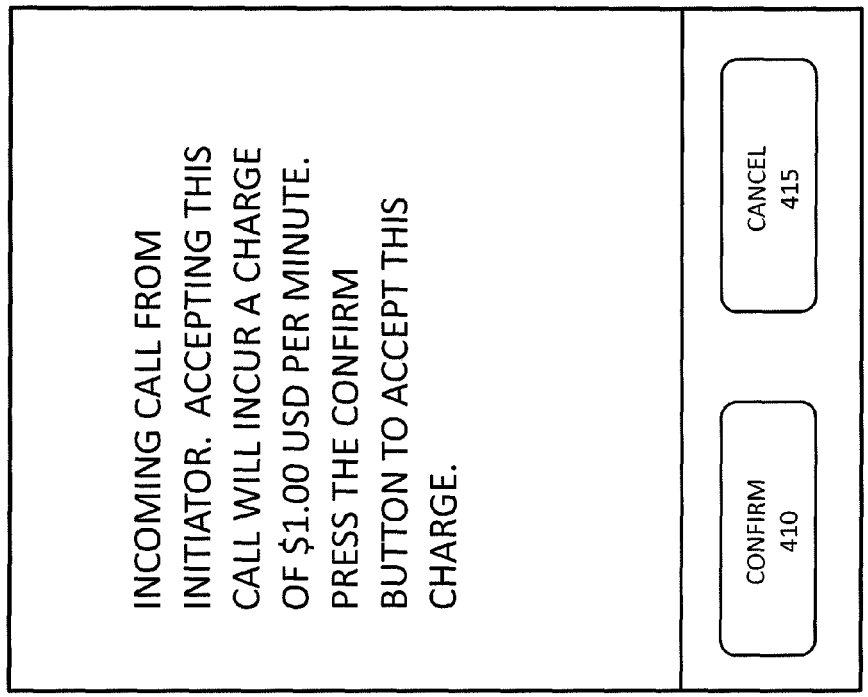

FIG. 4A illustrates a graphical user interface 405 that can be displayed on mobile device 110B when an incoming call is received from initiator 105A. Depending on the type of call placed by initiator 105A (i.e., either local call or roaming call), target 110A can incur a service charge for answering the incoming call. As explained above, if initiator 105A places an outgoing local call, then one or more of service providers 105C and 110C can deliver or transfer the call to target 110A as an incoming roaming call. Target 110A can be charged for answering the incoming roaming call. Service providers 105C or 110C can send the amount to be charged to the mobile application running on mobile device 110B, and graphical user interface 405 can display the amount to be charged for answering the incoming call. Target 110A can consent to the charge and answer the call by selecting confirm button 410 or reject the call by selecting cancel button 415. If, however, initiator 105A places an outgoing roaming call, then one or more of service providers 105C and 110C can deliver or transfer the call to target 110A as an incoming local call. Because initiator 105A paid the charge associated with the roaming call, target 110A can answer the call free of charge. In this latter example, graphical user interface 405 can be modified to indicate that target 110A will not incur a charge for answering the call.

In addition to answering calls, target 110A can also retrieve voicemail messages and text messages. Starting from home screen 200, target 110A can retrieve voicemail messages by selecting button 210 or retrieve text messages by selecting button 220. In some implementations, buttons 210 and 220 can indicate the number of new voicemail messages or new text messages that have not yet been retrieved, accessed, played, or read. Selecting voicemail button 210 can cause the mobile application running on mobile device 110B to display one or more of the graphical user interfaces illustrated in FIGS. 4B-4C. Selecting text message button 220 can cause the mobile application running on mobile device 110B to display one or more of the graphical user interfaces illustrated in FIGS. 4D-4F.

Figure 4C:
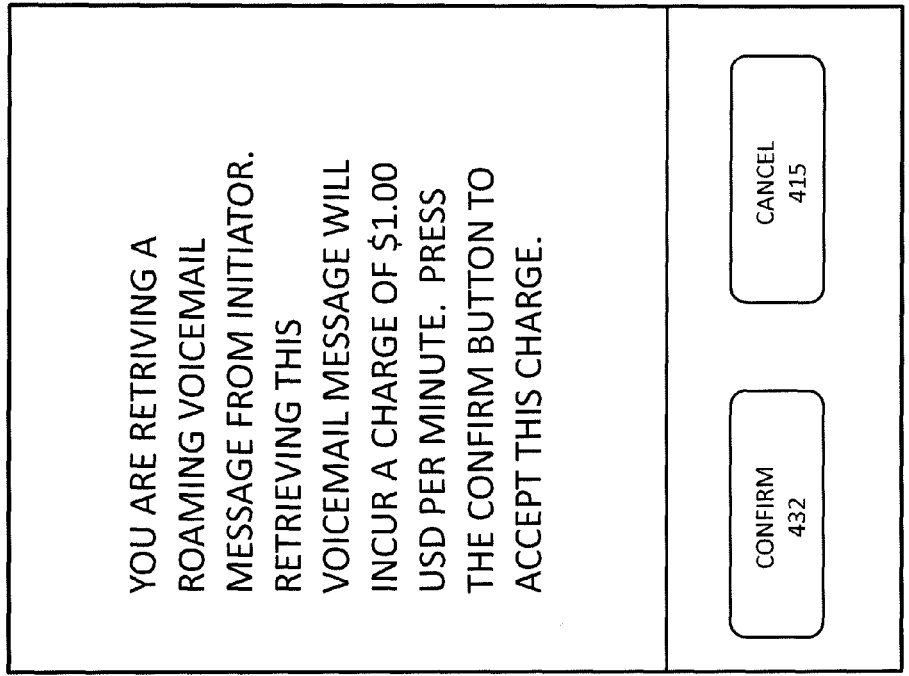
Figure 4B:
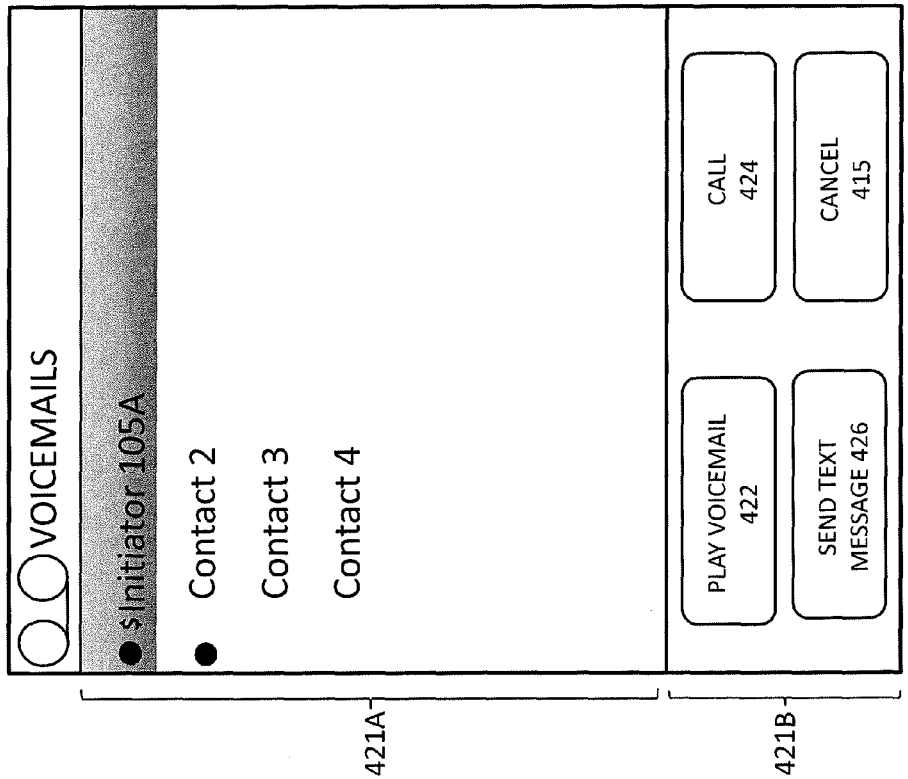

FIG. 4B illustrates a graphical user interface 420 that target 110A can use to retrieve, play, or access voicemail messages. Mobile device 110B can display graphical user interface 420 when target 110A selects voicemail button 210 from home screen 200. Graphical user interface 420 can include areas 421A and 421B. Area 421A can represent the target's voicemail box. This voicemail box can include a list of callers who have left voicemail messages for target 110A. In some implementations, area 421A can display the date and time that the voicemail message was received, and the list of voicemail messages can be arranged in chronological order, reverse chronological order, and the like. These messages can be marked with a bullet point "●" or other symbol to indicate that the message is new (i.e., has not been retrieved, played, or accessed). Messages can also be marked with a dollar sign "$" or other symbol to indicate that a charge may be incurred for retrieving, playing, or accessing the voicemail message. As explained above, target 110A can retrieve an incoming local voicemail message for free but can incur a charge for retrieving an incoming roaming voicemail message. For example, if initiator 105A leaves an outgoing local voicemail message for initiator 110A, one or more of service providers 105C and 110C can transfer the voicemail message to the target's voicemail box as an incoming roaming voicemail message. The service providers can levy a charge on the target for retrieving, playing, or accessing the roaming voicemail message. In the example of FIG. 4B, there are two new voicemail messages—a first message from initiator 105A and a second message from contact 2. Because the voicemail message from initiator 105A is marked with a dollar sign "$", target 110A can incur a charge for retrieving, playing, or accessing this voicemail message.

Target 110A can use the buttons in area 421B to perform different operations with respect to the list of callers identified in area 421A. For example, target 110A can play the voicemail message from initiator 105A by selecting her name from area 421A and selecting play voicemail button 422. Because this voicemail message is marked with a dollar sign "$", one or more of service providers 105C and 110C can levy a charge on target 110A for playing the voicemail message.

FIG. 4C illustrates a graphical user interface 430 that can indicate the amount to be charged for playing an incoming roaming voicemail message. Mobile device 110B can display graphical user interface 430 when target 110A selects an incoming roaming voicemail message to play from graphical user interface 420. Graphical user interface 420 may not be displayed if target 110A selects an incoming local voicemail message (i.e., a voicemail message that can be played for free). One or more of service providers 105C and 110C can provide the charge amount to mobile device 110B which, in turn, can cause this amount to be displayed. If target 110A consents to the charge, she can select confirm button 432 to play the voicemail message. In some implementations, one or more of service providers 105C and 110C can levy the charge after target 110A has selected confirm button 432. If target 110A does not consent to the charge, she can select cancel button 415 to return to home screen 200.

After target 110A has played the voicemail message from initiator 105A, the mobile application can remove the bullet point "●" next to the initiator's name in graphical user interface 420. Removing this symbol can indicate that the message has been retrieved, played, or accessed. In some implementations, the mobile application can remove the dollar sign "$" next to the initiator's name to indicate that no additional charge will be levied on target 110A for re-playing the voicemail message. Whether target 110A is charged again can depend on the service agreement between target 110A and service providers 105C and 110C. In some implementations, one or more of service providers 105C and 110C can cause the mobile application to remove the dollar sign "$" next to the initiator's name when target 110A wanders back into zone (i.e., no longer out of zone). Likewise, if target 110A wanders out of zone, the dollar sign "$" can be reapplied by one or more of service providers 105C and 110C.

In addition to playing voicemail messages, target 110A can also use graphical user interface 420 to call or send text messages to the callers identified in area 421A. Target 110A can call contact 2 by selecting the contact's name from area 421A and selecting call button 424. If contact 2 is out of zone relative to target 110A, the target can place this call either as a local call or a roaming call. Target 110A can send a text message to contact 3 by selecting the contact's name and selecting send text message button 426. This functionality can be convenient if, for example, target 110A needs to send a follow-up text message to contact 3 after listening to the contact's voicemail message. If contact 3 is out of zone relative to target 110A, then the target can send this text message either as a roaming text message or as a local text message as described above. Once button 426 is selected, mobile device 110B can display graphical user interface 383 illustrated in FIG. 3F to compose and send a text message as described above. Target 110A can return to home screen 200 by selecting cancel button 415.

Figures 4D, 4E:
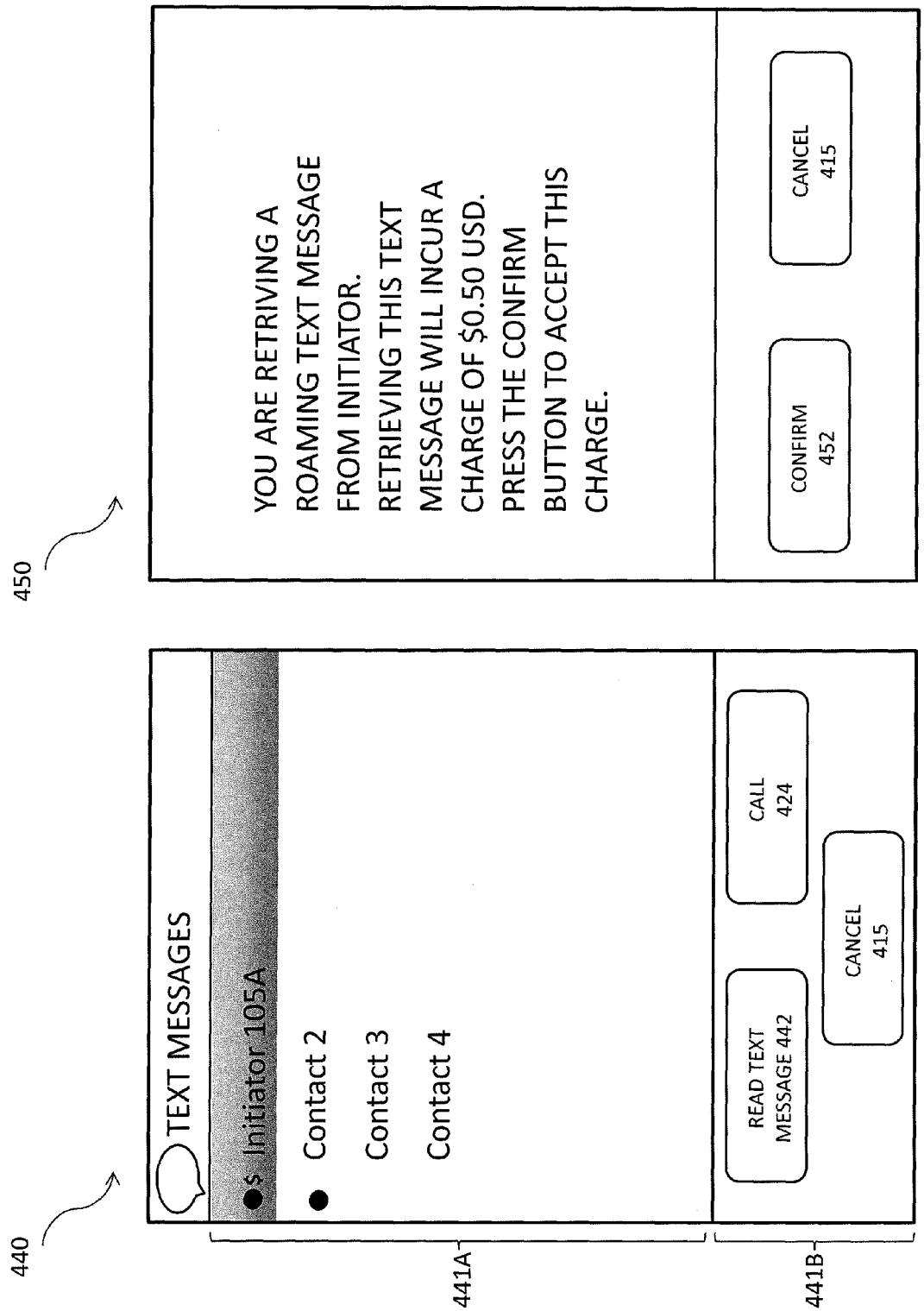

FIG. 4D illustrates a graphical user interface 440 that target 110A can use to retrieve, read, or access text messages. Mobile device 110B can display graphical user interface 440 when target 110A selects text message button 220 from home screen 200. Graphical user interface 440 can be similar to graphical user interface 420.

Graphical user interface 440 can include areas 441A and 441B. Area 441A can represent the target's text message box. This text message box can include a list of people who have sent text messages to target 110A. In some implementations, area 441A can display the date and time that the text message was received, and the list of text messages can be arranged in chronological order, reverse chronological order, and the like. The text messages can be marked with a bullet point "●" to indicate a message is new (i.e., has not been retrieved, read, or accessed) and a dollar sign "$" to indicate that a charge may be incurred for retrieving, reading, or accessing the text message. Other types of symbols can also be used. In the example of FIG. 4D, there are two new text messages—a first message from initiator 105A and a second message from contact 2. Because the text message from initiator 105A is marked with a dollar sign "$", target 110A can incur a charge for retrieving, reading, or accessing this message. This text message may be marked with a dollar sign "$" if, for example, initiator 105A started the text message as an outgoing local communication session, and or more of service providers 105C and 110C transferred the text message to the target's text message box as an incoming roaming communication session. As explained above, target 110A can incur a charge for accessing, reading, or retrieving a roaming text message.

Target 110A can use the buttons in area 441B to perform different operations with respect to the list of people identified in area 441A. For example, target 110A can read the text message from initiator 105A by selecting the initiator's name from area 441A and selecting read text message button 442. Because this text message is marked with a dollar sign "$", one or more of service providers 105C and 110C can levy a charge on target 110A for reading the text message.

FIG. 4E illustrates a graphical user interface 450 that can indicate the amount to be charged for reading a roaming text message. Mobile device 110B can display graphical user interface 450 when target 110A selects an incoming roaming text message to read from graphical user interface 440. Graphical user interface 450 may not be displayed if target 110A selects an incoming local text message (i.e., a text message that can be read for free). One or more of service providers 105C and 110C can provide the charge amount to mobile device 110B which, in turn, can cause this amount to be displayed. In some implementations, one or more of service providers 105C and 110C can levy the charge after target 110A has selected confirm button 452. If target 110A does not consent to the charge, she can select cancel button 415 to return to home screen 200. Target 110A can consent to the charge and read the text message by selecting confirm button 452.

If confirm button 452 is selected, mobile device 110B can display graphical user interface 460 illustrated in FIG. 4F. Graphical user interface 460 can include a text message thread in area 462. The text message thread can display all text messages exchanged between initiator 105A and target 110A. The newest text message from initiator 105A can be displayed at the bottom of the thread. Target 110A can compose a reply text message in area 464 and send the text message to initiator 105A. This reply message can be sent either as a roaming text message (by selecting button 467) or as a local text message (by selecting button 469). Target 110A can also call initiator 105A by selecting call button 424. If initiator 105A is out of zone relative to target 110A, the target can place this call either as a local call or a roaming call. Because buttons 424, 467, and 469 allow target 110A to initiate a communication session with initiator 105A, selecting one of these buttons can reverse the roles described above such that target 110A becomes the initiator (i.e., initiates communication) and initiator 105A becomes the target (i.e., receives communication) and the processes described above with respect to FIGS. 3A-3H and 4A-4F can be repeated.

After target 110A has read the text message from initiator 105A, the mobile application can remove the bullet point "●" next to the initiator's name in graphical user interface 440. Removing this symbol can indicate that the text message has been retrieved, read, or accessed. In some implementations, the mobile application can remove the dollar sign "$" next to the initiator's name to indicate that target 110A will not be charged for re-reading the text message. Whether target 110A is charged again can depend on the service agreement between target 110A and service providers 105C and 110C. In some implementations, one or more of service providers 105C and 110C can cause the mobile application to remove the dollar sign "$" next to the initiator's name when target 110A wanders back into zone (i.e., no longer out of zone). Likewise, if target 110A wanders out of zone, the dollar sign "$" can be reapplied by one or more of service providers 105C and 110C.

In addition to reading text messages, target 110A can perform other operations using graphical user interface 440. Target 110A can call contact 2 by selecting the contact's name from area 441A and selecting call button 424. To return to home screen 200, target 110A can select cancel button 415.

FIG. 5 illustrates a process 400 for initiating a communication session by a first mobile device with a second mobile device.

At 510, one or more of service providers 105C and 110C can receive a request from a first mobile device. In some implementations, the first mobile device can request initiation of a communication session with a second mobile device. The communication session can be a phone call, a video call, a voicemail message, or a text message.

At 520, one or more of service providers 105C and 110C can determine whether the second mobile device is out of zone. The second mobile device can be out of zone if, for example, the first and second mobile devices are in different time zones or different countries, the first mobile device is a predetermined distance away from the second mobile device, if the second mobile device is roaming outside of a predetermined zone (e.g., outside of a home area), or if a charge is incurred for initiating communication by initiator 105A or for accessing or responding to the communication by target 110A, and the like. In some implementations, whether the second mobile device is out of zone can depend on different combinations of these conditions.

At 530, one or more of service providers 105C and 110C can cause the first mobile device to display a first user interface. In some implementations, the first user interface can correspond to one or more of graphical user interfaces 330, 365, 375, and 387. This graphical user interface can indicate that the second mobile device is not available (e.g., out of zone) and provide different options for communicating with the second mobile device. These options can include initiating an outgoing roaming communication session or an outgoing local communication session with the second mobile device.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A method comprising:

receiving, by at least one processor, a request from a first mobile device to initiate a communication session with a second mobile device;

determining, by at least one processor, whether the second mobile device is out of zone; and causing, by at least one processor, the first mobile device to display a first user interface based on the determining, the first user interface providing options for selection by a user of the first mobile device to initiate the communication session, the options including at least an outgoing roaming communication session and an outgoing local communication session with the second mobile device.

2. The method of claim 1, wherein the second mobile device is out of zone when at least one of the following conditions is satisfied:

the first mobile device and the second mobile device are in different time zones;

the first mobile device and the second mobile device are in different countries;

the first mobile device is a predetermined distance away from the second mobile device;
the second mobile device is roaming outside of a predetermined zone; and
a charge is incurred for initiating communication by the first mobile device or for accessing the communication by the second mobile device.

3. The method of claim 1, wherein the communication session, the outgoing roaming communication session, and the outgoing local communication session comprise one or more of a phone call, a video call, a voicemail message, and a text message.

4. The method of claim 1, wherein the first user interface displays a message indicating that the second mobile device is out of zone.

5. The method of claim 1, further comprising:
levying, by at least one processor, a charge on the first mobile device for initiating an outgoing roaming communication session.

6. The method of claim 5, further comprising:
sending, by at least one processor, an amount to be charged to the first mobile device; and
receiving, by at least one processor, confirmation of consent to the amount to be charged from the first mobile device,
wherein the sending and the receiving are performed before the levying.

7. The method of claim 1, further comprising:
allowing, by at least one processor, the first mobile device to initiate an outgoing local communication session free of charge.

8. The method of claim 1, further comprising:
receiving, by at least one processor, the outgoing roaming communication session from the first mobile device; and
sending, by at least one processor, the outgoing roaming communication session to the second mobile device as an incoming local communication session.

9. The method of claim 8, further comprising:
allowing, by at least one processor, the second mobile device to access the incoming local communication session free of charge.

10. The method of claim 1, further comprising:
receiving, by at least one processor, the outgoing local communication session from the first mobile device; and
sending, by at least one processor, the outgoing local communication session to the second mobile device as an incoming roaming communication session.

11. The method of claim 10, further comprising:
levying, by at least one processor, a charge on the second mobile device for accessing the incoming roaming communication session.

12. The method of claim 11, further comprising:
sending, by at least one processor, an amount to be charged to the second mobile device; and
receiving, by at least one processor, confirmation of consent to the amount to be charged from the second mobile device,
wherein the sending and the receiving are performed before the levying.

13. A non-transitory computer-readable medium containing instructions to configure a processor to perform operations comprising:
receiving a request from a first mobile device to initiate a communication session with a second mobile device;
determining whether the second mobile device is out of zone; and
causing the first mobile device to display a first user interface based on the determining, the first user interface providing options for selection by a user of the first mobile device to initiate the communication session, the options including at least an outgoing roaming communication session and an outgoing local communication session with the second mobile device.

14. The non-transitory computer-readable medium of claim 13, the operations further comprising:
levying a charge on the first mobile device for initiating an outgoing roaming communication session; and
allowing the first mobile device to initiate an outgoing local communication session free of charge.

15. The non-transitory computer-readable medium of claim 13, the operations further comprising:
receiving the outgoing roaming communication session from the first mobile device;
sending the outgoing roaming communication session to the second mobile device as an incoming local communication session;
receiving the outgoing local communication session from the first mobile device; and
sending the outgoing local communication session to the second mobile device as an incoming roaming communication session.

16. The non-transitory computer-readable medium of claim 14, the operations further comprising:
allowing the second mobile device to access the incoming local communication session free of charge; and
levying a charge on the second mobile device for accessing the incoming roaming communication session.

17. A system comprising:
a processor; and
a memory, wherein the processor and the memory are configured to perform operations comprising:
receiving a request from a first mobile device to initiate a communication session with a second mobile device;
determining whether the second mobile device is out of zone; and
causing the first mobile device to display a first user interface based on the determining, the first user interface providing options for selection by a user of the first mobile device to initiate the communication session, the options including at least an outgoing roaming communication session and an outgoing local communication session with the second mobile device.

18. The system of claim 17, the operations further comprising:
levying a charge on the first mobile device for initiating an outgoing roaming communication session; and
allowing the first mobile device to initiate an outgoing local communication session free of charge.

19. The system of claim 17, the operations further comprising:
receiving the outgoing roaming communication session from the first mobile device;
sending the outgoing roaming communication session to the second mobile device as an incoming local communication session;
receiving the outgoing local communication session from the first mobile device; and
sending the outgoing local communication session to the second mobile device as an incoming roaming communication session.

20. The system of claim 19, the operations further comprising:
 allowing the second mobile device to access the incoming local communication session free of charge; and
 levying a charge on the second mobile device for accessing the incoming roaming communication session.

* * * * *